Fig. 2a

June 29, 1965 R. K. BRODERSEN 3,192,495
ELECTROMAGNETIC TRANSDUCERS

Filed Nov. 29, 1961 6 Sheets-Sheet 3

ROLF K. BRODERSEN
INVENTOR.

BY
ATTORNEYS

June 29, 1965 R. K. BRODERSEN 3,192,495
ELECTROMAGNETIC TRANSDUCERS
Filed Nov. 29, 1961 6 Sheets-Sheet 4

ROLF K. BRODERSEN
INVENTOR.

BY
ATTORNEYS

Fig. 8

ROLF K. BRODERSEN
INVENTOR.
ATTORNEYS

June 29, 1965 R. K. BRODERSEN 3,192,495
ELECTROMAGNETIC TRANSDUCERS
Filed Nov. 29, 1961 6 Sheets-Sheet 6

ROLF K. BRODERSEN
INVENTOR.

BY S. A. Giarratana
George B. Oujevolk
ATTORNEYS

United States Patent Office 3,192,495
Patented June 29, 1965

3,192,495
ELECTROMAGNETIC TRANSDUCERS
Rolf K. Brodersen, Orange, N.J., assignor to General Precision Inc., Little Falls, N.J., a corporation of Delaware
Filed Nov. 29, 1961, Ser. No. 155,786
10 Claims. (Cl. 336—135)

This invention relates to transducers for translating position into an electrical signal, and more particularly to electromagnetic transducers in which the magnetic path has a constant reluctance.

Devices for translating an angular position electromagnetically into an electrical signal fall generally into two main categories, those which have a constant reluctance magnetic path and those which have a variable reluctance magnetic path. In the latter category the output signal varying with angular position is achieved by varying the size of the air gap between a rotor and a stator, thus causing a concomitant variation in the magnetic flux across the air gap. This operation results in a reaction force being developed affecting the motion of the rotor. This reaction force is undesirable in many applications. Because of these disadvantages the constant reluctance transducer was developed.

In the constant reluctance transducer the signal output is not a function of the air gap reluctance; ideally the flux transmitted through the air gap remains absolutely constant irrespective of the position of the rotor. One well known device of this type uses a rotor comprising a moving coil in the air gap of a stationary magnetic circuit. Such a device is free of reaction torques if no currents flow in the moving coil, and if the rotor is completely nonmagnetic. However, in order to obtain the output signal voltage from the moving coil, two flex leads or pigtails have to be connected to the moving coil and these pigtails result in a restraining force acting on the rotor.

In the transducers of the present invention, the reluctance of the magnetic path remains constant without making use of a moving coil. The secondary coil from which the output signal is produced and the primary coils are all mounted on the stator of the transducer. In order to achieve the variable signal output the constant air gap field is moved by the rotor across the secondary coil. By this movement of the field across the secondary coil there is produced a variable output signal, which depends upon the position of the rotor. Thus the transducers of the present invention have no reaction force affecting the rotation of the rotor and also have no pigtails connected to the rotor restraining it. The principles of the invention can also be applied to translate linear motion into an electrical signal without reaction forces.

Accordingly, the principal object of the present invention is to provide an improved electromagnetic transducer for translating position into an electrical signal.

Another object of the present invention is to provide an improved electromagnetic transducer of the type described in which restraining and reaction forces on the moving part of the transducer are substantially eliminated.

A further object of the present invention is to provide a transducer of the type described in which magnetic reaction forces are eliminated and in which no pigtails connected to the moving part of the transducer are required.

Further objects and advantages of the present invention will become readily apparent as the following detailed description of the invention unfolds, and when taken in conjunction with the drawings, wherein:

Figure 1:
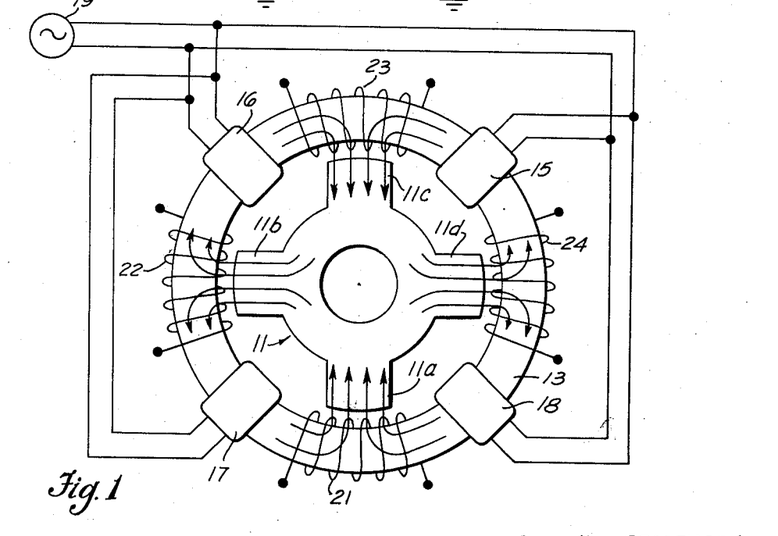
FIG. 1 illustrates one embodiment of the invention.

The embodiment of the invention shown in FIG. 1 comprises a ring-shaped rotor 11 provided with four poles 11a through 11d extending radially outward and spaced at equal angular intervals about the center of the rotor 11. Surrounding the rotor 11 and concentric therewith is a ring-shaped stator 13. The stator 13 and the rotor 11 are made of low reluctance material. Wound on the stator 13 at equally spaced angular positions are four primary windings 15 through 18, which are all energized by an A.C. source 19. Four secondary windings 21 through 24 are also wound on the stator 13 interspaced between the primary windings 15 through 18. The polarities of the adjacent primary windings are opposite. Thus the polarity of the winding 15 is opposite that of the windings 16 and 18, which in turn are opposite that of the winding 17. The rotor 11 is positioned with each of its poles opposite a different secondary winding.

The flux induced by the primary winding 15 will flow in the stator 13 from the winding 15 through the end of the secondary winding 23, out through the side of the winding 23 across an air gap to the pole 11c, through the rotor 11 to the pole 11d, across an air gap into the coil 24, and through the stator 13 to the coil 15 as indicated by the arrows in FIG. 1. In this manner the flux induced by the primary winding 15 links the secondary windings 23 and 24. The flux induced by each of the other primary windings follow similar paths as indicated by the arrows in FIG. 1. The flux induced by the primary winding 16 links secondary windings 22 and 23, the flux induced by the primary winding 17 links secondary windings 21 and 22, and the flux induced by the primary winding 18 links secondary windings 21 and 24. Because of the polarities of the primary windings, the flux flowing through the opposite ends of each secondary winding will be in opposite directions.

When the rotor 11 is positioned so that the poles 11a through 11d are precisely centered opposite the coils 21 through 24 respectively, each of the secondary coils 21 through 24 will not produce an output signal because the flux flowing into the opposite ends of each of these coils, being in opposite directions, will cancel itself out. This position of the rotor is referred to as the null position. The function of the apparatus is to translate a limited angular displacement of the rotor from this null position into an electrical signal.

When the rotor 11 is moved angularly from the null position each of the coils 21 through 24 will have a greater number of turns linked by flux flowing through one end than through the other, and thus will produce an output signal, which will increase as the rotor 11 is rotated further from its null position. Thus, if the rotor 11 is rotated in a clockwise direction, the coil 21 will have a greater number of turns linked by flux flowing from the primary winding 18 than from the primary winding 17 and will produce an output signal. Similarly, the coil 22 will have a greater number of turns linked by flux flowing from the primary winding 17 than from the coil 16 and will produce an output signal. In the same manner coils 23 and 24 will also produce output signals. The further that the rotor 11 is rotated from the null position, the greater will be the number of turns of the coil 21 linked by flux flowing from the primary winding 18, and conversely, the smaller will be the number of turns linked by flux flowing from the primary winding 17. Thus, up to a limit, the further the rotor 11 is moved in a clockwise direction from the null position, the greater will be the output signal produced from the secondary winding 21.

In a similar manner, the output signals from each of the other secondary windings 22 through 24 will increase as the rotor 11 is rotated in a clockwise direction from the null position. Similarly, the output signal from the winding 21 will increase when the rotor 11 is rotated in a counterclockwise direction from the null position, due to the increasing number of turns of the winding 21 linked by the flux flowing from the primary winding 17 and the decreasing number of turns linked by the flux flowing from the primary winding 18. However, when the rotor 11 is rotated in a counterclockwise direction, because the output signal produced in the winding 21 is due to a preponderance of the flux flowing from the primary winding 17, the output signal from the secondary winding 21 will be of opposite phase from that produced by the secondary winding 21 when the rotor 11 is rotated from the null position in a clockwise direction. In a similar manner each of the windings 22 through 24 will produce increasing output signals as the rotor 11 is rotated in a counterclockwise direction and the phase of these output signals will be opposite to that produced when the rotor is rotated in a clockwise direction.

With this arrangement, the size of the air gap traversed by the flux passing between the stator and the rotor will always remain the same and the amount of flux flowing across the air gap will be constant. Therefore no reaction forces will be produced on the rotor tending to cause rotation and this result is achieved without the undesirable feature of having windings on the rotor requiring leads connected to the rotor.

Figure 2A:
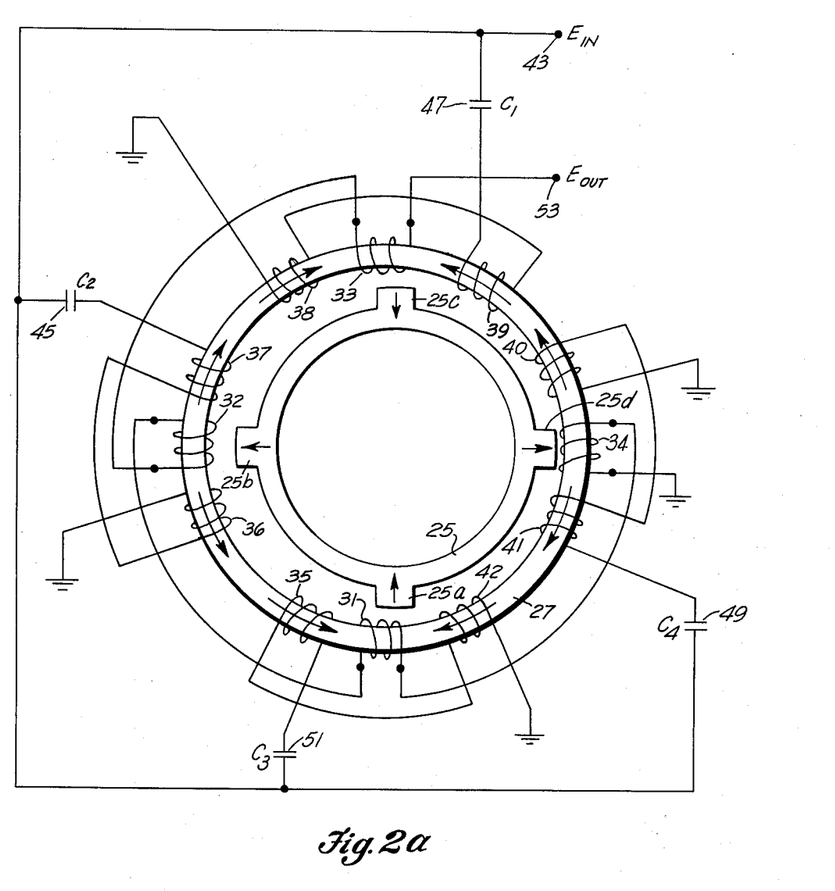
FIGS. 2a and 2b illustrate a modification of the embodiment of the invention shown in FIG. 1.
Figure 2B:
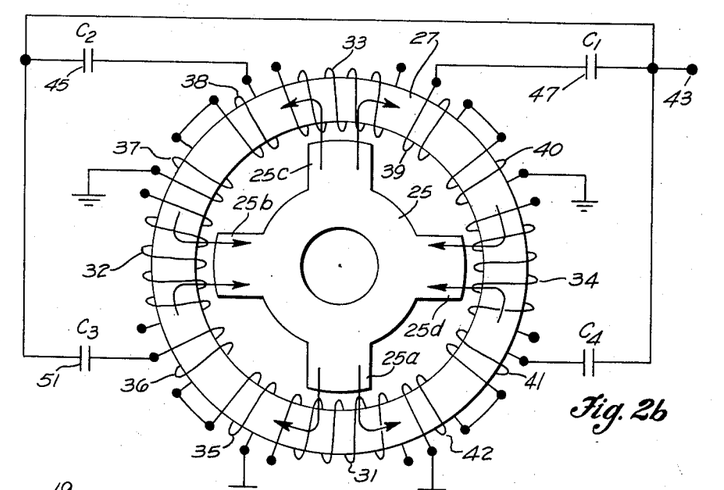

The embodiment shown in FIGS. 2a and 2b is a modification of the embodiment of FIG. 1. Each of the primary coils of the embodiment of FIG. 1 has been replaced by two separate primary coils and the primary coils are energized through capacitors for purposes of tuning. The apparatus comprises a ring-shaped rotor 25, having four radially extending poles 25a, 25b, 25c and 25d spaced at equal angular intervals. Surrounding the rotor is a ring-shaped stator 27. The rotor 25 and the stator 27 are made of low reluctance material. Wound on the stator 27 at equal angular intervals are four secondary windings 31 through 34. Between the secondary windings 31 and 32, two primary windings 35 and 36 are wound on the stator 27. These two primary windings may be interconnected as shown in FIG. 2b. Between the secondary windings 32 and 33 on the stator 27 are wound primary windings 37 and 38. Between the secondary windings 33 and 34 on the stator 27 are wound two primary windings 39 and 40 and between the secondary windings 34 and 31 are wound primary windings 41 and 42. A.C. power is applied to the primary windings 35 through 42 from an input terminal 43.

In FIG. 2a the primary windings 36 and 37 are connected in series with a capacitor 45 between the input terminal 43 and ground. The primary windings 38 and 39 are connected in series with a capacitor 47 between the input terminal 43 and ground. The primary windings 40 and 41 are connected in series with a capacitor 49 between the input terminal 43 and ground and the primary windings 35 and 42 are connected in series with a capacitor 51 between the terminal 43 and ground. The windings 35 and 36 are wound to have the same polarity so that the flux induced in the stator by these windings will be in the same direction. The windings 37 and 38 are wound to have the same polarity but the opposite polarity from the windings 35 and 36. Similarly, the windings 41 and 42 have the same polarity but an opposite polarity from the windings 35 and 36, whereas the windings 39 and 40 have the same polarity but the opposite polarity from the windings 41 and 42. In operation the rotor 25 is positioned so that its poles 25a, 25b, 25c and 25d are positioned opposite the secondary windings 31 through 34, respectively. In FIG. 2b a similar effect is produced by modification of the circuit arrangement.

With this arrangement, the flux pattern produced in the rotor and stator will be substantially the same as that produced in the embodiment shown in FIG. 1, and as the angular position of the rotor 25 is changed from the null position an output will be generated in the secondary windings 31 through 34 in the same manner as in the embodiment shown in FIG. 1. In the embodiment of FIG. 2a the secondary windings 31 through 34 are connected in series between an output terminal 53 and ground, so that the output voltages produced by each of the secondary windings add together to produce a large output voltage. As is the case in the embodiment of FIG. 1, the reluctance of the magnetic path will remain the same as the size of the air gaps will remain the same, and therefore the flux passing across the air gaps will remain constant. As a result, no reaction forces will be produced affecting the rotary motion of the rotor 25.

Ideally the rotor 25 should be made concentric with the stator 27 and all the air gaps between the poles 25a through 25d and the stator 27 should be equal. As a practical matter, however, the rotor 25 may be slightly off center and this condition has been exaggerated in the illustration of the apparatus in FIG. 2a. When the rotor 25 is not exactly centered, the air gaps between the poles 25a through 25d will not all be precisely the same and the flux flowing across these air gaps will have different strengths. If the magnetic induction by each of the primary windings is equal, this effect will cause the rotor 25 to have magnetic unbalance. The capacitors 45, 47, 49 and 51 can be adjusted for the purpose of tuning each of the four primary circuits. By selection of the proper capacitor values, such tuning conditions can be obtained as are necessary to magnetically suspend the rotor either in a neutral, or in a stable force-equilibrium. In addition, individual adjustments of each capacitor can be made in order to adjust the center of the magnetic suspension. Varying degrees of stiffness for the magnetic centering can be obtained as a function of the selected capacitor values, and depending on the coil impedances. Furthermore, the voltage across each of the four primary coils can be used as a measure of the radial position of the rotor inside the stator.

If tuned for a neutral force equilibrium, the rotor is free from radial forces as well as from tangential forces, so that the device is completely free from reaction forces.

Figure 3:
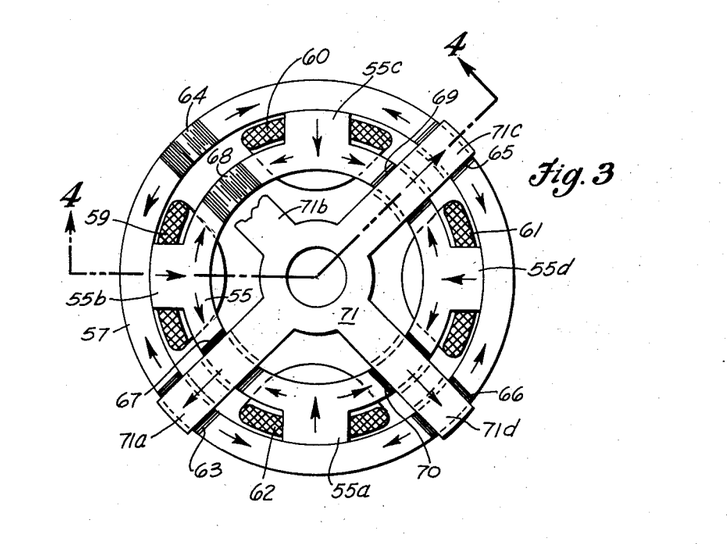
FIG. 3 is a plan view of another embodiment of the invention.
Figure 4:
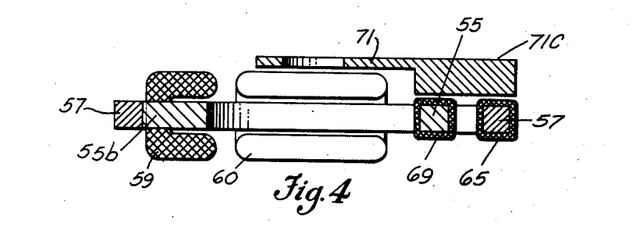
FIG. 4 is a sectional view of the embodiment shown in FIG. 3 taken along the lines 4—4.

The embodiment of the invention shown in FIGS. 3 and 4 comprises two ring-shaped stators 55 and 57, concentrically arranged. The inner ring-shaped stator 55 is provided with four radially extending members 55a, 55b, 55c and 55d, spaced at equal angular intervals and bridging between the inner stator 55 and the stator 57. Primary windings 62, 59, 60 and 61 are wound around the radially extending members 55a through 55d, respectively. Four secondary windings 63 through 66 are wound on the stator 57 at equal angular intervals about the center thereof with the secondary winding 63 being positioned midway between the radially extending members 55a and 55b, the secondary winding 64 being positioned midway between the radially extending members 55b and 55c, the secondary winding 65 being positioned midway between the members 55c and 55d, and the secondary winding 66 being positioned midway between the radially extending members 55d and 55a.

Four secondary windings 67 through 70 are wound on the stator 55 at equal angular intervals about the center thereof positioned opposite to and in the same angular position as the secondary windings 63 through 66, respectively.

A rotor 71 having arms 71a through 71d extending radially outward therefrom is mounted coaxially with the stators 55 and 57. The arms 71a through 71d extend out over the stators 55 and 57 closely adjacent thereto, the arm 71b being broken away for purposes of illustration. The arms 71a through 71d are mounted so that small air gaps are defined between the arms 71a through 71d and the stators 55 and 57, and the arms form magnetic bridges between the stators.

The flux induced by the primary winding 62 will flow from the radially extending member 55a through the stator 55 to the secondary winding 67, from the secondary winding 67 across an air gap to the rotor arm 71a, through the rotor arm 71a and across an air gap to the secondary winding 63, and from the secondary winding 63 through the stator 57 to the radially extending member 55a, and from the member 55a through the stator 55 to the secondary winding 70, from the secondary winding 70 across an air gap to the rotor arm 71d, through the rotor arm 71d across an air gap to the secondary winding 66, and from the secondary winding 66 to the radially extending member 55a. In this manner the flux induced by the primary winding 62 will link the secondary windings 63, 67, 70 and 66. In a similar manner the flux induced by the primary winding 59 will link the secondary windings 64, 68, 67 and 63 through the rotor arms 71a and 71b, the flux induced by the primary winding 60 will link the secondary windings 64, 68, 69 and 65 through the rotor arms 71b and 71c, and the flux induced by the primary winding 61 will link the secondary windings 66, 70, 69 and 65 through the rotor arms 71d and 71c. The primary windings 59 through 62 are all energized from a common source and have polarities to induce flux in the same radial direction so that when the winding 59 is inducing flux towards the center, the windings 60, 61 and 62 will be inducing flux towards the center, and when the winding 59 is inducing flux away from the center, the windings 60 through 62 will also be inducing flux away from the center. Each of the secondary windings will be linked by flux from two primary windings, and because of the polarity of the primary windings, the flux linking each secondary winding from different primary windings will be in opposite directions.

When the rotor 71 is positioned so that each of the rotor arms 71a through 71d is precisely centered over its adjacent secondary windings, each of the secondary windings will have an equal number of turns linked by flux from two primary windings, and since this flux is in opposite directions, each of the secondary windings will produce no output signal. When the rotor is in this position, it will be in its null position. When the rotor is moved from its null position it will increase the number of turns of each secondary winding linked by flux from one primary winding and decrease the number of turns linked by flux from the other primary winding, and this increase and decrease will continue as the rotor is moved further from the null position. As a result each of the secondary windings will produce an output signal which varies with the displacement of the rotor from the null position. If the rotor is moved in a clockwise direction from the null position, the secondary windings will produce an output signal of one phase, and if the rotor is moved in a counterclockwise direction from the null position the secondary windings will produce an output signal of the opposite phase.

Thus the apparatus of FIGS. 3 and 4 will accurately translate an angular position into an electrical signal.

This result is achieved with a device in which the air gaps between the rotor and the stator do not vary with the angular position, and accordingly the strength of the flux flowing across the air gaps does not vary with the angular position. Thus no reaction forces affect the angular motion of the rotor 71.

Figure 5:
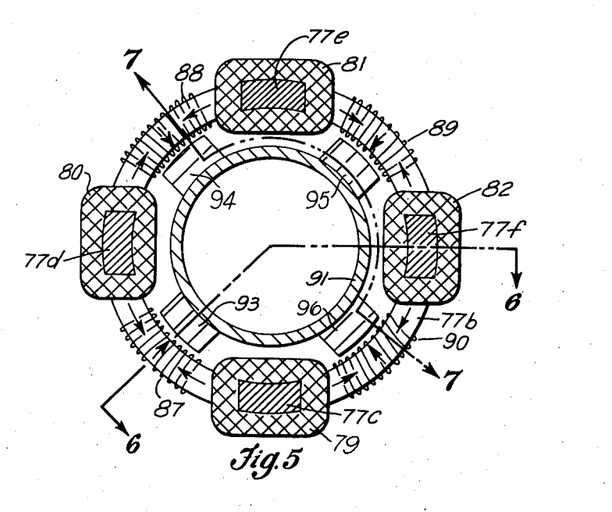
FIG. 5 is a cross sectional view of another embodiment of the invention, taken along the lines 5—5 in FIG. 6.
Figure 6:
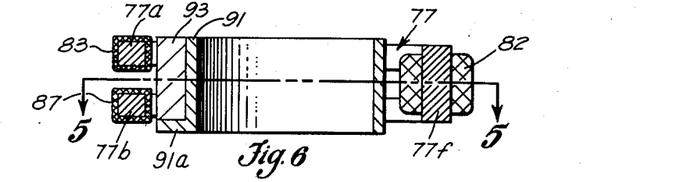
FIG. 6 is a sectional view of the embodiment shown in FIG. 5 taken along the line 6—6.
Figure 7:
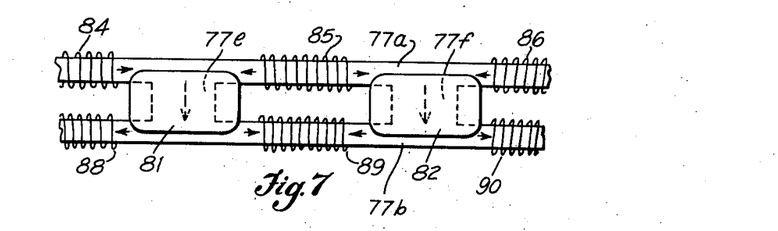
FIG. 7 is a developed view of a portion of the stator of the device shown in FIG. 5 looking radially outward.

The embodiment of the invention shown in FIGS. 5, 6 and 7 comprises a stator 77 consisting of two coaxially positioned ring-shaped members 77a and 77b axially spaced from one another and joined by axially extending portions 77c, 77d, 77e and 77f, which are spaced at equal angular positions about the center of the stator. Primary windings 79, 80, 81 and 82 are wound around the axially extending portions 77c, 77d, 77e and 77f respectively. Four secondary windings 87 through 90 are wound around the portion 77b of the stator interspaced between the axially extending members 77c through 77f, with the secondary winding 87 being positioned between the axially extending portions of the stator 77c and 77d, the secondary winding 88 being positioned between the members 77d and 77e, the secondary winding 89 being positioned between the members 77e and 77f, and the secondary winding 90 being positioned between the members 77f and 77c.

The member 77a is also wound with four secondary windings 83 througth 86 spaced at equal angular intervals about the center of the stator opposite to and in the same angular position as the windings 87 through 90 respectively so that the secondary winding 83 is positioned between the axially extending members 77c and 77d, the secondary winding 84 is positioned between the axially extending members 77d and 77e, the secondary winding 85 is positioned between the axially extending members 77e and 77f, and the secondary winding 86 is positioned between the axially extending members 77f and 77c.

A rotor comprising a ring 91 and four arms 93 through 96 extending radially outward from the rotor is mounted within the stator 77 coaxially therewith. The ring 91 is provided with outwardly extending tabs 91a upon which the arms 93 through 96 are mounted. The stator 77 and the rotor arms 93 through 96 all comprise low reluctance material. The arms 93 through 96 extend axially a sufficient distance to provide magnetic bridges between the portions of the stator rings 77a and 77b with small radial air gaps between the stator 77 and the arms 93 through 96. At the null condition, rotor 91 is positioned so that the arms 93 through 96 are opposite the secondary windings 83 and 87, 84 and 88, 85 and 89, and 86 and 90 respectively. With this arrangement, the flux induced by the primary winding 82 will flow from the axially extending members 77f through the stator portion 77b into the secondary winding 89, from the secondary winding 89 across an air gap to the rotor arm 95, through the rotor arm 95 and across an air gap to the secondary winding 85, and from the secondary winding 85 through the stator portion 77a to the axially extending stator portion 77f, and from the position 77f through the stator portion 77b into the secondary winding 90, from the secondary winding 90 across an air gap to the rotor arm 96, through the rotor arm 96 across an air gap into the secondary winding 86, and from the secondary winding 86 through the stator portion 77a to the stator portion 77f. In this manner flux induced by the primary winding 82 will link turns of the secondary windings 85, 89, 86 and 90. In a similar manner flux induced by the primary winding 81 will link secondary windings 84, 85, 89 and 88, flux induced by the primary winding 80 will link secondary windings 83, 87, 84 and 88, and flux induced by the primary winding 79 will link the secondary windings 86, 90, 83 and 87. Thus each of the secondary windings 83 through 90 will be linked by flux generated by two primary windings.

The primary windings 79 through 82 are all energized from a common A.C. source and the polarities are such that they all generate flux in the same axial direction. As a result the flux linking each secondary winding from the adjacent primary windings, and as a result will pro- directions. The number of turns of a secondary winding linked by flux from a primary winding will depend upon the position of the rotor.

When the rotor is positioned so that the rotor arms 93 through 96 are precisely centered opposite the adjacent secondary windings, each secondary winding will have an equal number of turns linked by the flux flowing from the adjacent primary windings, and as a result will pro- duce no output signal. When the rotor is moved in either direction from this null position, this condition will be unbalanced in a manner similar to that described with reference to the embodiments of FIGS. 1 through 4 and the secondary windings will produce output signals, the phase of which will depend upon whether the rotor is moved in a clockwise or counterclockwise direction from the null position.

It will be observed that in the device shown in FIGS. 5 through 7 that the air gaps remain of constant size when the rotor is rotated and the strength of the flux flowing across the air gaps will remain constant. As a result, no reaction force affecting the rotation of the rotor 91 will occur.

Figure 8:
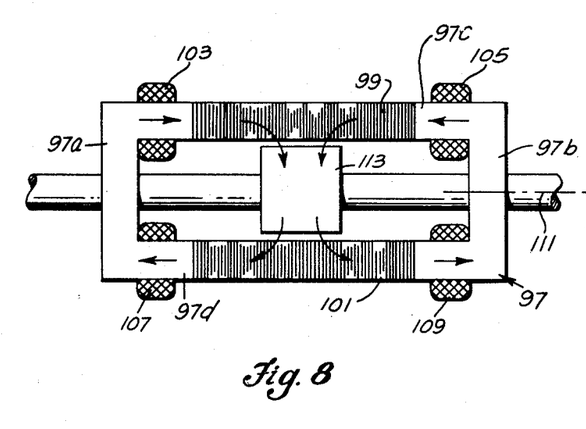
FIG. 8 is a sectional view of an embodiment of the invention which translates linear motion into an electrical signal.

The embodiment shown in FIG. 8 is a device to trans- late linear motion rather than rotary motion into an elec- trical signal. The apparatus comprises a rectangular core 97 consisting of end members 97a and 97b joined by side members 97c and 97d. A pair of primary windings 103 and 105 are wound on the side member 97c spaced from one another. Between the primary windings 103 and 105 a secondary winding 99 is wound on the side member 97c. A pair of primary windings 107 and 109 are wound on the side member 97d spaced from one another and a secondary winding 101 is wound on the side member 97d between the primary windings 107 and 109.

The end members 97a and 97b are journaled in their centers to receive a shaft 111 which is free to slide with respect to the end pieces 97a and 97b. Fixed to the shaft 111 is an armature 113 which extends between the side members 97c and 97d adjacent the secondary windings 99 and 101. The core 97 and the armature 113 are of low reluctance material and the armature 113 provides a magnetic path between the side members 97c and 97d. Flux induced by the primary windings 103 and 107 will flow from the end member 97a through the side member 97c into the secondary winding 99, from the secondary winding 99 across an air gap to the armature 113, through the armature 113 and across an air gap to the secondary winding 101, and from the secondary winding 101 through the side member 97d to the end member 97a.

In this manner flux induced in the core by the primary windings 103 and 107 will link the secondary windings 99 and 101. Flux induced by the primary windings 105 and 109 will flow from the end member 97b through the side member 97c into the secondary winding 99, from the secondary winding 99 across an air gap to the armature 113, through the armature 113 and across an air gap to the secondary winding 101, and from the secondary winding 101 through the side member 97d to the end member 97b. In this manner flux induced by the pri- mary windings 105 and 109 links the secondary windings 99 and 101.

The primary windings 103, 105, 107 and 109 are all energized from a common A.C. source. The polarities of the primary windings 105 and 109 are such that they induce flux in the core 97 in the same direction, and similarly the primary windings 103 and 107 induce flux in the core 97 in the same direction. However, the polarities of these primary windings are chosen such that the flux flowing between the end member 97b and the secondary winding 99 is in the opposite direction from the flux flowing between the end member 97a and the secondary winding 99, and similarly the flux flowing be- tween the end member 97b and the secondary winding 101 is in the opposite direction from the flux flowing between the end member 97a and the secondary wind- ing 101. With this arrangement the output signal voltages produced from the secondary windings 99 and 101 will vary as a function of the position of the shaft 111 and the armature 113. When the shaft 111 is positioned so that the armature 113 is adjacent the middle of the sec- ondary windings 99 and 101, each of the secondary wind- ings 99 and 101 will not produce an output signal. When the armature 113 is in this position it is in its null position. When the armature 113 is moved in either direction from this null position, it will increase the number of turns linked by flux flowing through one end and decrease the number of turns linked by flux flowing through the other end of each of the windings 99 and 101. As a result these windings will produce output signals, which will vary in accordance with the distance which the armature 113 is displaced from the null position. The output signals will be of one phase when the armature 113 is moved in one direction from the null position and will be of the opposite phase when it is moved in the other direction from the null position.

It will be observed that the air gaps between the arma- ture 113 and the core 97 remain constant as the armature 113 is moved. As a result the amount of flux flowing between the core 97 and the armature 113 across the air gaps will remain constant and no reactionary forces will be generated affecting the lateral motion of the arma- ture 113.

Figures 9, 10:
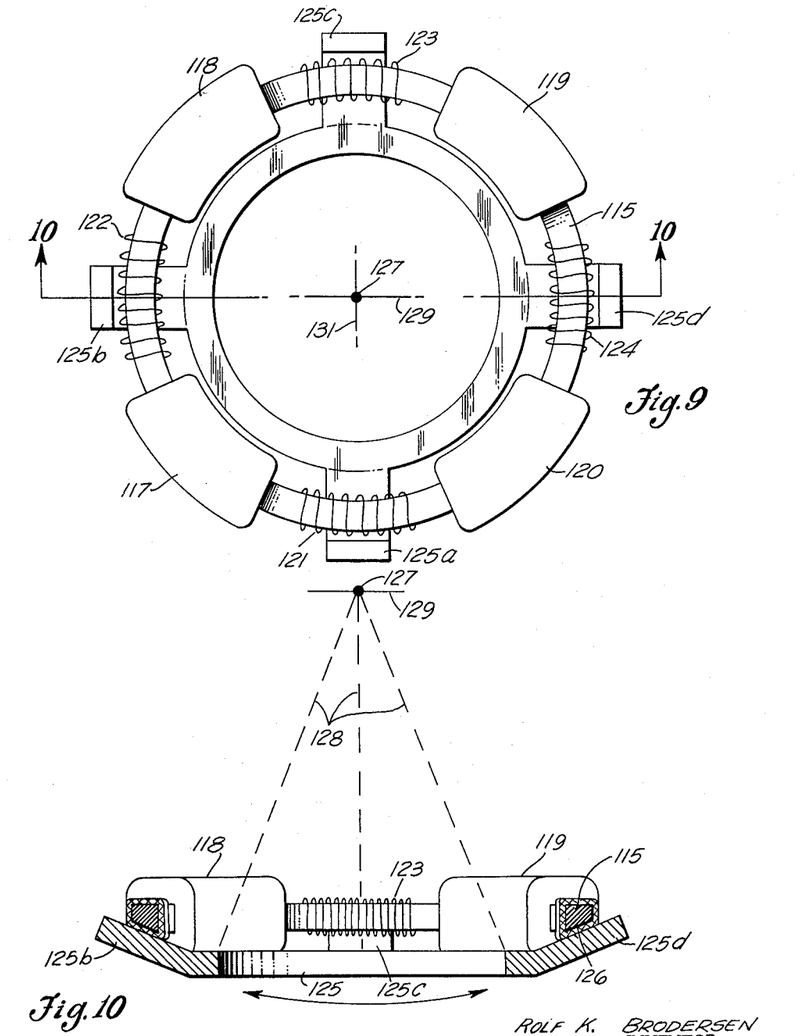
FIG. 9 shows a plan view of another embodiment of the invention, which embodiment will translate either rotary motion or pivotal movement into an electrical signal.
FIG. 10 is a sectional view of the embodiment shown in FIG. 9 taken along the line 10—10.

The embodiment shown in FIGS. 9 and 10 comprises a ring-shaped stator 115 on which are wound four pri- mary windings 117 through 120 spaced at equal angular intervals around the center of the stator. Four secondary windings 121 through 124 spaced at equal angular inter- vals are wound on the stator 115 interspaced between the primary windings 117 through 120. A ring-shaped arma- ture 125 is mounted coaxially with the stator 115. Both the stator 115 and the armature 125 are made of low reluctance material. The armature 125 is provided with four arms 125a, 125b, 125c and 125d extending radially outward, and passing adjacent to and beyond the stator 115.

As best shown in FIG. 10, the arms 125a through 125d flare upwardly toward the stator 115 as they extend out- wardly. At the null condition, armature 125 is positioned so that the arms 125a through 125d are adjacent the sec- ondary windings 121 through 124 respectively. Those portions of the stator 115 around which the secondary windings 121 through 124 are wound are beveled on their lower outer sides, which are the sides adjacent the arma- ture arms 125a through 125d, so that the surfaces of the stator 115 facing the armature arms are parallel to the opposing surfaces of the armature arms. The arma- ture arms 125a through 125d as they flare upwardly pass closely adjacent to these beveled surfaces leaving a small air gap between these beveled surfaces and the armature arms. The primary windings 117 through 120 are all en- ergized from a common A.C. source. The polarities of these primary windings are such that the flux induced in the stator by the primary winding 117 is in the opposite direction from the flux induced by the primary windings 118 and 120, which in turn induce flux in the stator 115 in the opposite direction from the flux induced by the primary winding 119. The secondary windings 121 through 124 with this arrangement will produce output signals which vary with the angular position of the arma- ture 125 in a manner similar to the apparatus shown in FIG. 1. Since the air gaps between the armature 125 and the armature arms will remain constant as the arma- ture 125 is rotated, the flux passing through the air gaps will remain constant and no reactionary forces will affect the rotation of the armature 125.

The armature 125 is also mounted for a universal pivot- ing motion about a pivot point 127 by means of a mechanical connection 128 indicated schematically by the dashed lines between the armature 125 and the pivot point 127 in FIG. 10. When the armature pivots about the axis 129 passing through the pivot point 127, the armature arms 125a and 125c will remain centered in their null positions adjacent to secondary windings 121 and 123, and accordingly these windings will not produce any output signal. The armature arms 125b and 125b, however, will move from their null positions along the stator 115 and accordingly the secondary windings 122 and 124 will produce output signals proportional to the distance they have moved. The output signals will be of one phase when the armature 125 is pivoted in one direction about the axis 129 and will be of the opposite phase when the armature is pivoted in the other direction about the axis 129. Thus the secondary windings 122 and 124 will produce output signals representing pivoting of the armature about the axis 129. In a similar manner the secondary windings 121 and 123 will produce output signals representing the pivoting of the armature about the axis 131 passing through the pivot point 127, the axis 131 being perpendicular to the axis 129. The beveled faces 126 of the stator 115 as well as the opposing faces of the armature arms 125a through 125d approximate spherical surfaces the centers of which are at the pivot point 127. With this approximation, the air gaps betwen the stator 115 and the armature arms 125a through 125d remain constant when the armature pivots about the pivot point 127 in any direction. Accordingly, the flux across the air gaps will remain constant and no reactionary forces will be generated affecting the pivoting of the armature about the pivot point 127.

The basic principles of the invention incorporated into the apparatus shown in FIGS. 1 through 10 may be incorporated into many other embodiments, and many modifications may be made to the apparatus of FIGS. 1 through 10 without departing from the spirit and scope of the invention, which is defined in the appended claims.

What is claimed is:

1. A transducer comprising a stator made entirely of low reluctance material defining a magnetic path, first and second primary windings wound with opposite polarities on said stator around said path, a secondary winding wound on said stator around said path between said first and second primary windings, and a low reluctance member positioned adjacent to said secondary winding and movably mounted for limited displacement along said secondary winding, said stator and movable member having respective confronting surfaces defining an air gap therebetween, said surfaces being so shaped as to maintain said air gap constant over the entire range of displacement of said movable member.

2. A transducer comprising a stator made entirely of low reluctance material, a winding wound on said stator, first means to induce A.C. flux in said stator on one side of said winding, second means to induce A.C. flux in said stator on the opposite side of said winding, the flux induced by said first means flowing in said winding in an opposite direction to the flux flowing in said winding induced by said second means, a low reluctance member positioned adjacent said secondary winding and movably mounted for limited displacement along said secondary winding, said stator and movable member having respective confronting surfaces defining an air gap therebetween, said surfaces being so shaped as to maintain said air gap constant over the entire range of displacement of said movable member.

3. A transducer comprising a stator made entirely of low reluctance material, a winding wound on said stator, first means to induce A.C. flux in said stator on one side of said winding, second means to induce A.C. flux in said stator on the opposite side of said winding, the flux induced by said first means flowing in said winding in an opposite direction to the flux flowing in said winding induced by said second means, and means movable a finite distance along said coil to divert a constant amount of flux from said stator out through the side of said coil, at least a portion of said movable means being made of low reluctance material, said stator and the low reluctance portion of said movable means having respective confronting surfaces defining an air gap therebetween, said surfaces being so shaped as to maintain said air gap constant over the entire range of movement of said movable means.

4. A transducer comprising a ring-shaped stator made entirely of low reluctance material, a first primary winding wound on said stator, a second primary winding wound on said stator, a secondary winding wound on said stator between said first and second primary windings, a rotor made of low reluctance material mounted coaxially with said stator, said stator and rotor having respective confronting surfaces defining an air gap therebetween, said surfaces being so shaped as to maintain said air gap constant over the entire operating range of said rotor.

5. A transducer comprising a ring-shaped stator, a first secondary winding wound on said stator, a second secondary winding wound on said stator angularly spaced from said first secondary winding, a first primary winding wound on said stator positioned on one side of said first secondary winding between said first secondary winding and said second secondary winding, a second primary winding wound on said stator positioned on the other side of said first secondary winding between said first secondary winding and said second secondary winding, a third primary winding wound on said stator positioned on one side of said second secondary winding between said second secondary winding and said first secondary winding, and a fourth primary winding wound on said stator on the other side of said second secondary winding between said second secondary winding and said first secondary winding, a first capacitor, a second capacitor, a first circuit connecting said first and second primary windings in series with said first capacitor, a second circuit connecting said third and fourth primary windings in series with said second capacitor, means to apply A.C. power across said first and second circuits, the polarities of said first and second primary windings being such as to induce flux to flow in said first secondary winding in opposite directions, said third and fourth primary windings having polarities such as to induce flux to flow in said second secondary winding in opposite directions, a rotor made of low reluctance material mounted substantially coaxially with said stator and having a first portion adjacent said first secondary winding defining an air gap between said stator and said first portion and a second portion adjacent said secondary winding defining an air gap between said stator and said second portion.

6. A transducer comprising a first ring-shaped stator, a second ring-shaped stator, concentric with said first ring-shaped stator positioned within said first ring-shaped stator, said first and second stators being made of low reluctance material, a first radially extending member magnetically bridging between said first and second stators, a second radially extending member magnetically bridging between said first and second stators angularly spaced from said first radially extending member, a first primary winding wound around said first radially extending member, a second primary winding wound around said second radially extending member, a first secondary winding wound on said first stator between said first and second radially extending members, a second secondary winding wound on said first stator between said first and second radially extending members on the opposite side from said first secondary winding, a third secondary winding wound on said second stator in the same angular position as said first secondary winding, a fourth secondary winding wound on said second stator in the same angular position as said second secondary winding, and a rotor mounted coaxially with said first and second stators and having a first arm made of low reluctance material positioned adjacent said first and third secondary windings to provide a magnetic bridge therebetween with air gaps defined between said first arm and said first and second stators and having a second arm made of low reluctance material positioned adjacent said second and fourth secondary windings to provide a magnetic bridge therebetween with air gaps between said second arm and said first and second stators.

7. A transducer comprising a first ring-shaped stator, a second ring-shaped stator positioned coaxially with said first ring-shaped stator but axially spaced therefrom, said first and second stators being made of low reluctance material, a first axially extending member magnetically bridging said first and second stators, a second axially extending member magnetically bridging said first and second stators, a first primary winding wound around said first axially extending member, a second primary winding wound around said second axially extending member, a first secondary winding wound around said first stator between said first and second axially extending members, a second secondary winding wound around said first stator between said axially extending members on the opposite side thereof from said first secondary winding, a third secondary winding wound around said second stator in the same angular position as said first secondary winding, a fourth secondary winding wound around said second stator in the same angular position as said second secondary winding, a rotor coaxial with said first and second stators and having a first arm made of low reluctance material positioned adjacent said first and third secondary windings providing a magnetic bridge therebetween with air gaps between said first arm and said first and second stators and having a second arm made of low reluctance material positioned adjacent said second and fourth secondary windings providing a magnetic bridge therebetween with air gaps between said second arm and said first and second stators.

8. A transducer comprising:
   a generally annular core member of low magnetic reluctance material, said core member including a pair of parallel legs and end portions interconnecting the respective ends of said legs;
   a pair of axially spaced primary coils oppositely wound on one of said core legs;
   a single secondary winding on said one core leg intermediate and symmetrically disposed with respect to said primary coils; and
   an armature member of low magnetic reluctance material mounted between said legs for axial displacement therebetween and providing a magnetic path between said secondary winding and the other of said legs with air gaps between the armature member and legs.

9. A transducer according to claim 8 including:
   a second pair of axially spaced primary coils wound on the other of said core legs; and
   an additional secondary winding on said other core leg intermediate and symmetrically disposed with respect to said primary coils.

10. A transducer comprising a ring-shaped stator, a secondary winding wound on said stator, a first primary winding wound on said stator on one side of said secondary winding, a second primary winding wound on said stator on the opposite side of said secondary winding, said stator being made of low reluctance material, an armature pivotable about a point on the axis of said stator but axially spaced from said stator, said armature having a portion made of low reluctance material adjacent said secondary winding and defining an air gap between said portion and said stator, said stator and said portion of said armature having opposing faces approximating spherical surfaces about said pivot point.

References Cited by the Examiner

UNITED STATES PATENTS

| 705,482 | 7/02 | Thierman | 336—135 X |
| 1,762,008 | 6/30 | Burnengo | 336—133 |
| 2,488,734 | 11/49 | Mueller | 336—135 X |
| 2,702,867 | 2/55 | Wightman | 310—168 X |
| 2,816,240 | 12/57 | Zimmerman | 310—168 X |
| 2,975,384 | 3/61 | Geiser | 336—229 X |

FOREIGN PATENTS

| 1,113,564 | 3/56 | France. |
| 21,357 | 9/09 | Great Britain. |

JOHN F. BURNS, *Primary Examiner.*